(12) United States Patent
Jones et al.

(10) Patent No.: US 8,386,527 B2
(45) Date of Patent: Feb. 26, 2013

(54) METHOD AND SYSTEM FOR EFFICIENTLY SHARING ARRAY ENTRIES IN A MULTIPROCESSING ENVIRONMENT

(75) Inventors: Kerry N. Jones, Muncie, IN (US); William F. Wise, Jr., Houston, TX (US)

(73) Assignee: Pocket Soft, Inc., Houston, TX (US)

( * ) Notice: Subject to any disclaimer, the term of this patent is extended or adjusted under 35 U.S.C. 154(b) by 62 days.

(21) Appl. No.: 12/956,054

(22) Filed: Nov. 30, 2010

(65) Prior Publication Data

US 2011/0131586 A1 Jun. 2, 2011

Related U.S. Application Data

(60) Provisional application No. 61/264,882, filed on Nov. 30, 2009.

(51) Int. Cl.
  *G06F 7/00* (2006.01)
  *G06F 17/30* (2006.01)
(52) U.S. Cl. .................................. 707/801; 707/803
(58) Field of Classification Search .................. 707/790, 707/791, 801, 802, 803
  See application file for complete search history.

(56) References Cited

U.S. PATENT DOCUMENTS

| | | | |
|---|---|---|---|
| 3,723,976 A | 3/1973 | Alvarez et al. | |
| 3,735,360 A | 5/1973 | Anderson et al. | |
| 6,292,826 B1 * | 9/2001 | Zaifman et al. | 709/213 |
| 6,862,608 B2 * | 3/2005 | Buhlman et al. | 709/213 |
| 7,750,915 B1 | 7/2010 | Acocella et al. | |
| 7,755,631 B1 | 7/2010 | Mrazek et al. | |

OTHER PUBLICATIONS

Knuth, The Art of Computer Programming, vol. I, Second Edition, sections 1.4.4-5.

* cited by examiner

*Primary Examiner* — Marc Somers
(74) *Attorney, Agent, or Firm* — Law Office of Tim Cook P.C.

(57) ABSTRACT

A method and a system efficiently and effectively share array entries among multiple threads of execution in a multiprocessor computer system. The invention comprises a method and an apparatus for array creation, a method and an apparatus for array entry data retrieval, a method and an apparatus for array entry data release, a method and an apparatus for array entry data modification, a method and an apparatus for array entry data modification release, a method and an apparatus for multiple array entry atomic release-and-renew, a method and an apparatus for array destruction, a method and an apparatus for specification of array entry discard strategy, a method and an apparatus for specification of array entry modification update strategy, and finally a method and an apparatus for specification of user-provided array entry data construction method.

4 Claims, 8 Drawing Sheets

12 → SVACreate

| Inputs | Output |
|---|---|
| 26 → WriteStrategy | |
| 28 → DiscardStrategy | |
| 30 → Serialization | |
| 32 → NumMasters | SVAIdentifier |
| 34 → NumSlaves | |
| 36 → EntrySize | |
| 38 → GetMasterEntry | |
| 40 → GetSlaveEntry | |
| 42 → KillMasterEntry | |
| 44 → KillSlaveEntry | |

Figure 2B

14 → SVARetrieveSlave

| Inputs | Output |
|---|---|
| 46 → SVAIdentifier | |
| 48 → EntryKey | SlaveBuffer → 52 |
| 50 → WaitFlag | |

Figure 2C

16 → SVAReleaseSlave

| Inputs | Output |
|---|---|
| 46 → SVAIdentifier (46) | <none> |
| 52 → SlaveBuffer (52) | |

Figure 2D

18 → SVAWriteMaster

| Inputs | Output |
|---|---|
| 46 → SVAIdentifier | |
| 48 → EntryKey | MasterBuffer → 54 |
| 50 → WaitFlag | |

Figure 2E

20 → SVAReleaseMaster

| Inputs | Output |
|---|---|
| 46 → SVAIdentifier | <none> |
| 54 → MasterBuffer | |

Figure 2F

22 → SVAReleaseRenew

| Inputs | Output |
|---|---|
| 46 → SVAIdentifier | |
| 56 → NumEntries | |
| 58 → SlaveArray | SuccessFlag → 62 |
| 60 → KeyArray | |
| 50 → WaitFlag | |

Figure 2G

24 → SVADestroy

| Inputs | Output |
|---|---|
| 46 → SVAIdentifier | <none> |

Figure 3

| 38 ► | GetMasterEntry | |
|---|---|---|
| | Inputs | Output |
| 54 ► | MasterBuffer | <none> |
| 48 ► | EntryKey | |

Figure 3A

| 40 ↘ | GetSlaveEntry | |
|---|---|---|
| | Inputs | Output |
| 54 ► | MasterBuffer | |
| 52 ► | SlaveBuffer | <none> |
| 48 ► | EntryKey | |

Figure 3B

| 42 ► | KillMasterEntry | |
|---|---|---|
| | Inputs | Output |
| 54 ► | MasterBuffer | |
| 48 ► | EntryKey | <none> |
| 64 ► | DirtyFlag | |

Figure 3C

| 44 ► | KillSlaveEntry | |
|---|---|---|
| | Inputs | Output |
| 52 ► | SlaveBuffer | <none> |
| 48 ► | EntryKey | |

Old Slave Entries — 86
88 → | Category 1 | Category 2 | ← 90

| Category 1 | Category 2 |
|---|---|
| Old entries with no corresponding New entry | Old entries with corresponding New entries. Master is currently unavailable |
| | Category 3 ← 92 |
| | Old entries with corresponding New entries. Master is currently available. |

Figure 8A

New Slave Entries — 94

96 → | Category 4 | Category 6 | ← 100

| Category 4 | Category 6 |
|---|---|
| New entries with corresponding Old entries. Master is currently unavailable | New entries with no corresponding Old entry. Master is currently unavailable |
| 98 → Category 5 | Category 7 ← 102 |
| New entries with corresponding Old entries. Master is currently available. | New entries with no corresponding Old entry. Master is currently available. |

Figure 8B

METHOD AND SYSTEM FOR EFFICIENTLY SHARING ARRAY ENTRIES IN A MULTIPROCESSING ENVIRONMENT

This application claims the benefit of U.S. Provisional Patent Application Ser. No. 61/264,882 filed Nov. 30, 2009.

FIELD OF INVENTION

The present invention relates generally to the field of programming in a multiprocessor environment and, more particularly, to a method and a structure for efficiently sharing array entries in such an environment.

BACKGROUND OF THE INVENTION

One of the great challenges in recent software engineering has been the struggle to use, effectively and efficiently, the computational resources of a multiprocessor computer. Traditionally, software tasks have been laid out in a linear, sequential fashion that is well-suited for programming on a single processor. However, most current computers have multiple processors, and keeping all these processors suitably occupied is quite difficult if there is, fundamentally, a single task being worked. The first challenge is to break a single task down into subtasks that can proceed in parallel, but a second is to share global resources among these subtasks in such a way as to optimally use available computational resources.

One of the most common methods for subtasking a long serial task is to have multiple subtasks working on overlapping segments of the task. This often requires that multiple processors have shared access to differing windows of a large resource that may be thought of as a virtual array—an array in which only the entries actually being used are actually constructed (or read from external storage). Many buffering schemes, well known in the art, may be employed to reduce the likelihood of needing to reconstruct array entries multiple times. However, none of these are specifically tuned for this particular pattern of access—one in which groups of array entries are typically required and the release of one group of entries will probably be immediately followed by retrieval of a second (possibly overlapping) group of entries.

The present invention provides a flexible solution to this problem, as well as providing a multiple-strategy mechanism for synchronization of changes to the array entries. The essence of the invention is to separate "master" array entries (constructed from external resources) from "slave" array entries (separate copies given to individual clients). The slave entries may be simply copies of the master entries or may be derived from them in a more complex, user-specified manner. Writes are done directly to the master entries, reads are done from the slave entries. We will refer to an instance of the invention as a Shared Virtual Array (SVA).

The use of memory to store the results of expensive calculations or interactions with storage media dates back to the earliest days of computer programming (see Knuth, The Art of Computer Programming, Volume I, Second Editions, sections 1.4.4-5 for a thorough and readable account of this). Originally, the impetus for the idea seems to have been mainly rate-matching between slow peripherals and much more rapid Arithmetic Logic Unit (ALU) processing, but it also became apparent early that by storing an expensive result for a while, one might obviate the need to reacquire that result, should it be needed later. Thus, for example, all contemporary operating systems internally buffer the physical sectors read from or written to a storage device in case some other task needs to read or write the same sector again soon. The data is normally retained in a fixed-size pool of buffers on a Most-Recently-Used (MRU) basis. Similarly, prudent software design dictates that the results of calculations are routinely retained until it is clear that they will not be needed again.

In addition, prudent hardware design (see Alvarez et al. (U.S. Pat. No. 3,723,976, Mar. 27, 1973) and Anderson et al. (U.S. Pat. No. 3,735,360, May 22, 1973)) has long made use of high-speed (relative to main memory) cache memories to reduce bus bandwidth requirements, to effectively pipeline processor instructions, and to assist with memory sharing when multiple processors are performing related tasks.

More recently, as computer graphics processing has become more multiprocessor-based, Graphics Processing Unit (GPU) designers have applied similar ideas to their art—see Acocella et al. (U.S. Pat. No. 7,750,915 B1, Jul. 6, 2010) and Mrazek et al. (U.S. Pat. No. 7,755,631 B1, Jul. 13, 2010).

As important as these ideas are to Central Processing Unit (CPU) and GPU design, their effect on software design has been minimal. Most software design that requires sharing of expensive array entries is typically ad hoc, employing some variant on the use of MRU-queued buffers with a backup method to re-compute or reread any entries that are needed after the source has fallen off the queue. There is no systematic method for efficiently buffering expensive array entries with an access pattern more typical of a multithreaded monolithic task.

More specifically, when multiple threads each access a more or less fixed size group of array entries, the MRU mechanism is no longer sufficient when a thread shifts its attention from one group of entries to another partially overlapping group. All entries in the former group may be essentially tied with one another on a MRU basis, but any array entry that is also in the latter group should be retained, since the thread is about to access it again. Access patterns, not MRU rules, are the real basis on which decisions about discarding expensive data should be made—MRU rules have always been simply used as a convenient proxy for access patterns. The difficulty, of course, is in providing an interface through which access patterns may be easily communicated to the system providing the buffering for the expensive data.

SUMMARY OF THE INVENTION

The present invention addresses these and other needs in the art of multi-processor programming by providing a method and system for efficiently and effectively sharing array entries among multiple threads of execution in a multiprocessor computer system. In other aspects, the invention comprises a method and an apparatus for array creation, a method and an apparatus for array entry data retrieval, a method and an apparatus for array entry data release, a method and an apparatus for array entry data modification, a method and an apparatus for array entry data modification release, a method and an apparatus for multiple array entry atomic release-and-renew, a method and an apparatus for array destruction, a method and an apparatus for specification of array entry discard strategy, a method and an apparatus for specification of array entry modification update strategy, and finally a method and an apparatus for specification of user-provided array entry data construction method.

DETAILED DESCRIPTION OF PREFERRED EMBODIMENTS

The invention consists of a defined software interface and software providing that interface. The software providing the interface may take any of a large variety of forms (dynamic link library, static library, source code, inclusion in a larger library). The enumeration of these forms is not intended to limit the scope of the invention but rather to illustrate possible embodiments.

Figure 1:
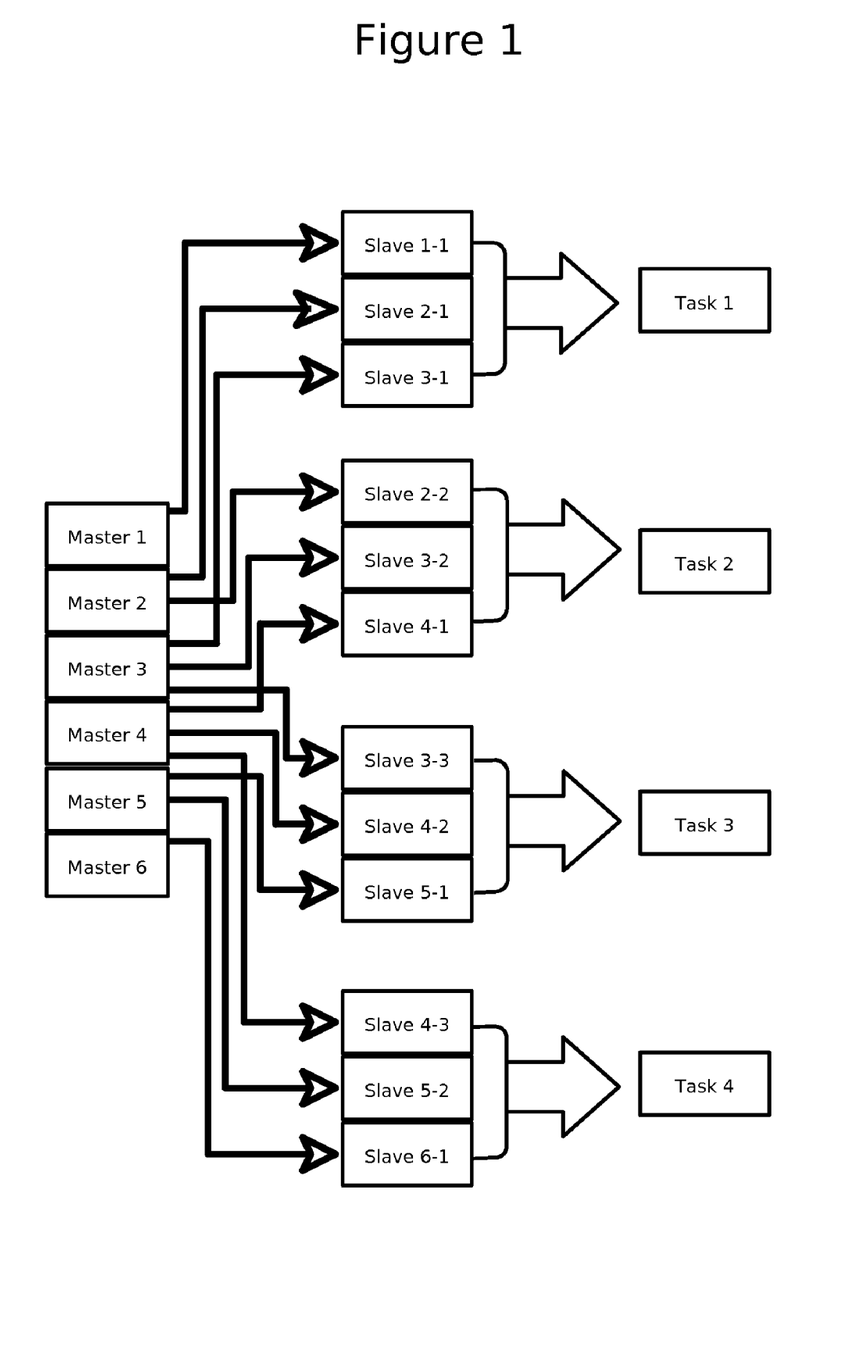
FIG. 1 is a schematic of a memory array showing an example of the invention in use, displaying the relationship among master entries, slave entries and tasks.
Figure 2A:
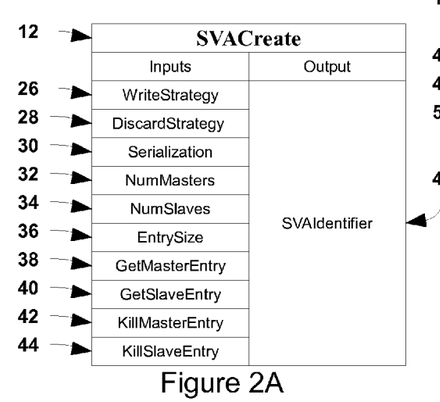
FIGS. 2A through 2G are schematics of subroutines showing the software interface of the invention.
Figure 2B:
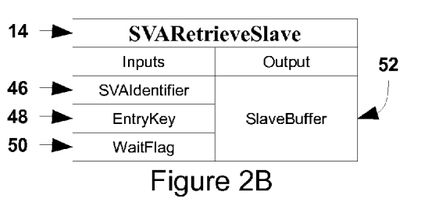
Figure 2C:
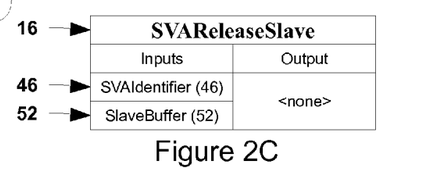
Figure 2D:
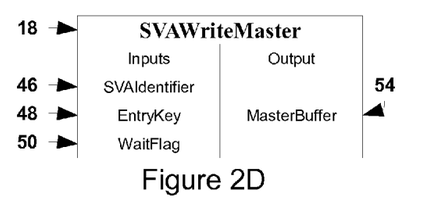
Figure 2E:
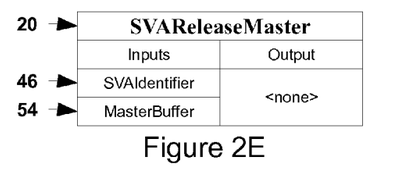
Figure 2F:
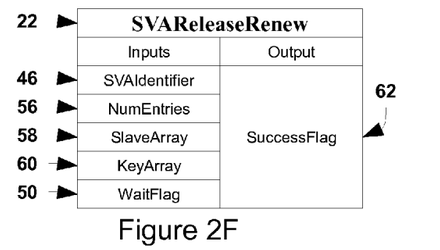
Figure 2G:
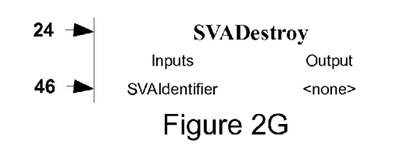

FIG. 1 shows the relationship among master entries, slave entries, and tasks in accordance with the teachings of the present invention. External data are read into or constructed in the master array entries; slave array entries are built from master array entries; and the results then transmitted to tasks as illustrated.

The software interface is shown in FIGS. 2A through 2G. The interface comprises seven subroutines, variously labeled SVACreate 12, SVARetrieveSlave 14, SVAReleaseSlave 16, SVAWriteMaster 18, SVAReleaseMaster 20, SVAReleaseRenew 22, and SVADestroy 24. In accordance with standard practice in the art, each subroutine also has an additional output, a code indicating overall success or failure of the subroutine.

Figures 4, 4A:
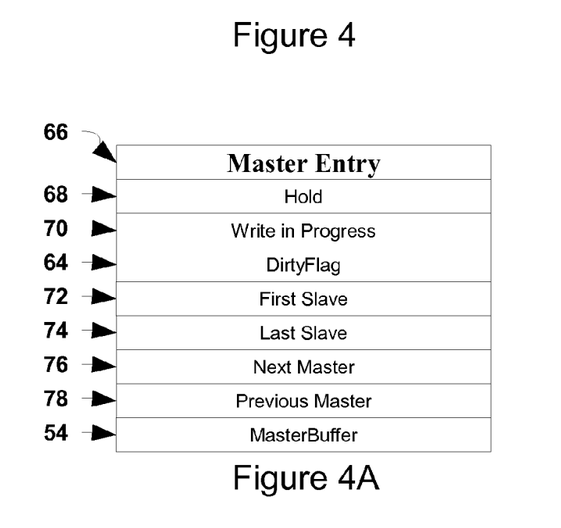
FIGS. 4A and 4B are schematics of subroutines showing the data structure for the master and slave entries.
Figure 4B:
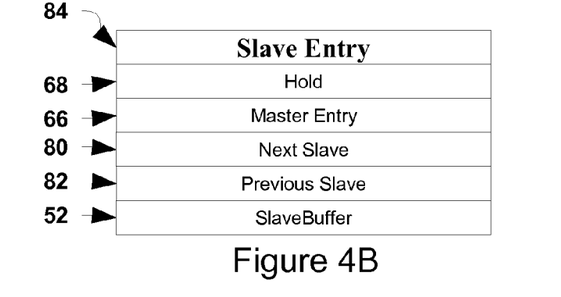

Turning briefly to FIG. 4, the data associated with the master and slave entries are shown. In addition to the specified data, there will be other data required for synchronization purposes since these data structures are accessed by multiple threads or processors. This synchronization may be accomplished by any of the standard methods well known in the art. In addition, a mechanism is needed for translating a slave or master buffer address back to the associated slave or master entry data. This also may be accomplished by a variety of mechanisms well known in the art.

Returning to FIG. 2, the subroutine SVACreate 12 (FIG. 2A) creates a SVA with the specified characteristics and allocates memory for master and slave entries. The characteristics of the SVA are determined by the selectors and user-provided subroutines that are input to SVACreate 12. The option selectors are: WriteStrategy 26, which selects from among a plurality of possible strategies for updating slave entries when master entries are altered; DiscardStrategy 28, which selects from among a plurality of possible strategies for deciding which master entries are to be discarded when necessary; and Serialization 30, which selects whether or not calls to the various user-provided subroutines are to be serialized, that is, forced to occur one at a time in a multithreaded environment. The size selectors are: NumMasters 32, which selects the number of master entry buffers to be allocated; NumSlaves 34, which selects the number of slave entry buffers to be allocated; and EntrySize 36, which selects the size of each buffer to be allocated. The user-provided subroutines are: GetMasterEntry 38, which constructs a master entry in a provided buffer; GetSlaveEntry 40, which constructs a slave entry in a provided buffer from a provided master entry; KillMasterEntry 42, which releases any resources allocated by GetMasterEntry 38 and optionally updates external resources if the master entry was modified; and KillSlaveEntry 44, which releases any resources allocated by GetSlaveEntry 40. If no resource release is necessary, KillMasterEntry 42 and KillMasterEntry 44 may be omitted. If no special construction of a slave entry is necessary, GetSlaveEntry 40 may be omitted and the master entry will be copied directly to the slave entry. The output from a successful SVACreate 12 invocation is an identification token SVAIdentifier 46 which is needed by the other six subroutines to identify which SVA is being referenced.

The strategies selectable by WriteStrategy 26 include, at a minimum, three strategies labeled "lazy," "unsafe," and "slow" (labeling by weaknesses rather than strengths). These are specifically as follows: "lazy" allows writes to a master to take place essentially at any time—slaves created following the completion of a write are built from the new master, but slaves built from the old master are never updated; "unsafe" updates all slaves as soon as the write is completed—some sort of external synchronization is necessary to force the consumers of slave entries to wait during the update process; "slow" forces a write to wait until there are no active slaves associated to that particular master—this will almost certainly force a long wait for a write and may even deadlock. "Lazy" is the default setting for this strategy.

The strategies selectable by DiscardStrategy 28 include, at a minimum, three strategies labeled "key," "time," and "LRU" (least recently used). These are specifically as follows: "key" discards the entry with the smallest key value; "time" discards the entry that was created the earliest; "LRU" discards the entry that was least recently used. These strategies are implemented using the Next Master 76 (see FIGS. 4A and 4B) and Previous Master 78 fields in the Master Entries 66 by maintaining a doubly-linked list in an appropriate order for each strategy. The Hold 68 flag is used to temporarily prevent a given Master Entry 66 from being discarded without disturbing its overall strategic priority.

Figure 5:
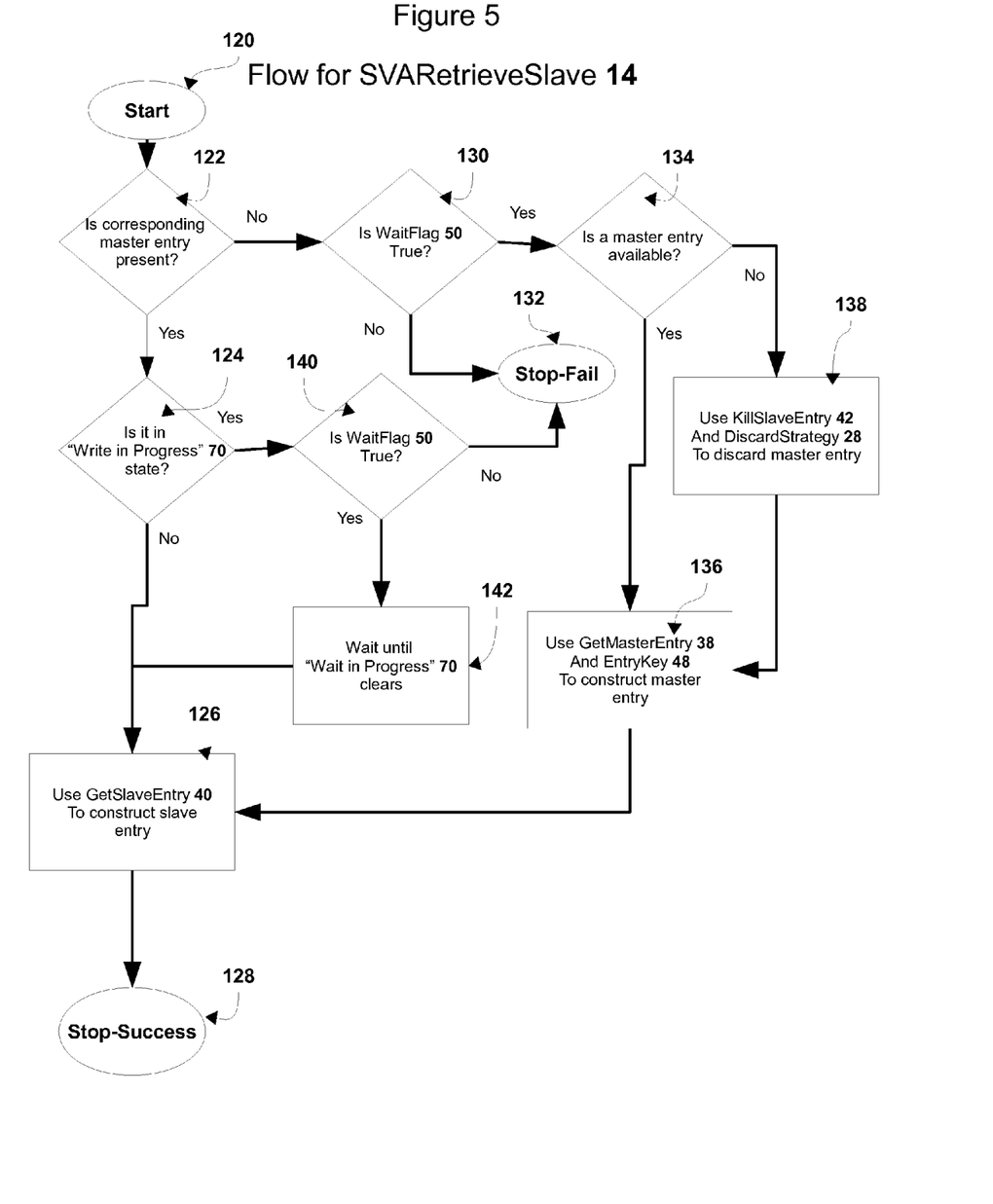
FIG. 5 is a logic flow diagram showing the logic flow for SVARetrieveSlave.

The subroutine SVARetrieveSlave 14 (FIG. 2B) uses the flowchart in FIG. 5 to retrieve a slave array entry from the SVA. The inputs to this subroutine are: SVAIdentifier 46, which identifies the particular SVA being operated upon; EntryKey 48, which is a numeric identifier used to select a particular entry of the SVA for retrieval—its precise meaning is user-defined, as it is simply passed to GetMasterEntry 38 for identifying a master entry to construct; and WaitFlag 50, which specifies whether the subroutine is to return or not if the indicated master entry is not immediately available. The output of SVARetrieveSlave 14 is SlaveBuffer 52, the address of the buffer containing the requested slave array entry.

The subroutine SVAReleaseSlave 16 (FIG. 2C) uses KillSlaveEntry 44 to release the resources associated to a given slave entry, and marks the entry as unused. The inputs to this subroutine are: SVAIdentifier 26, which identifies the particular SVA being operated on; and SlaveBuffer 52, the address of the slave entry buffer to release.

Figure 6:
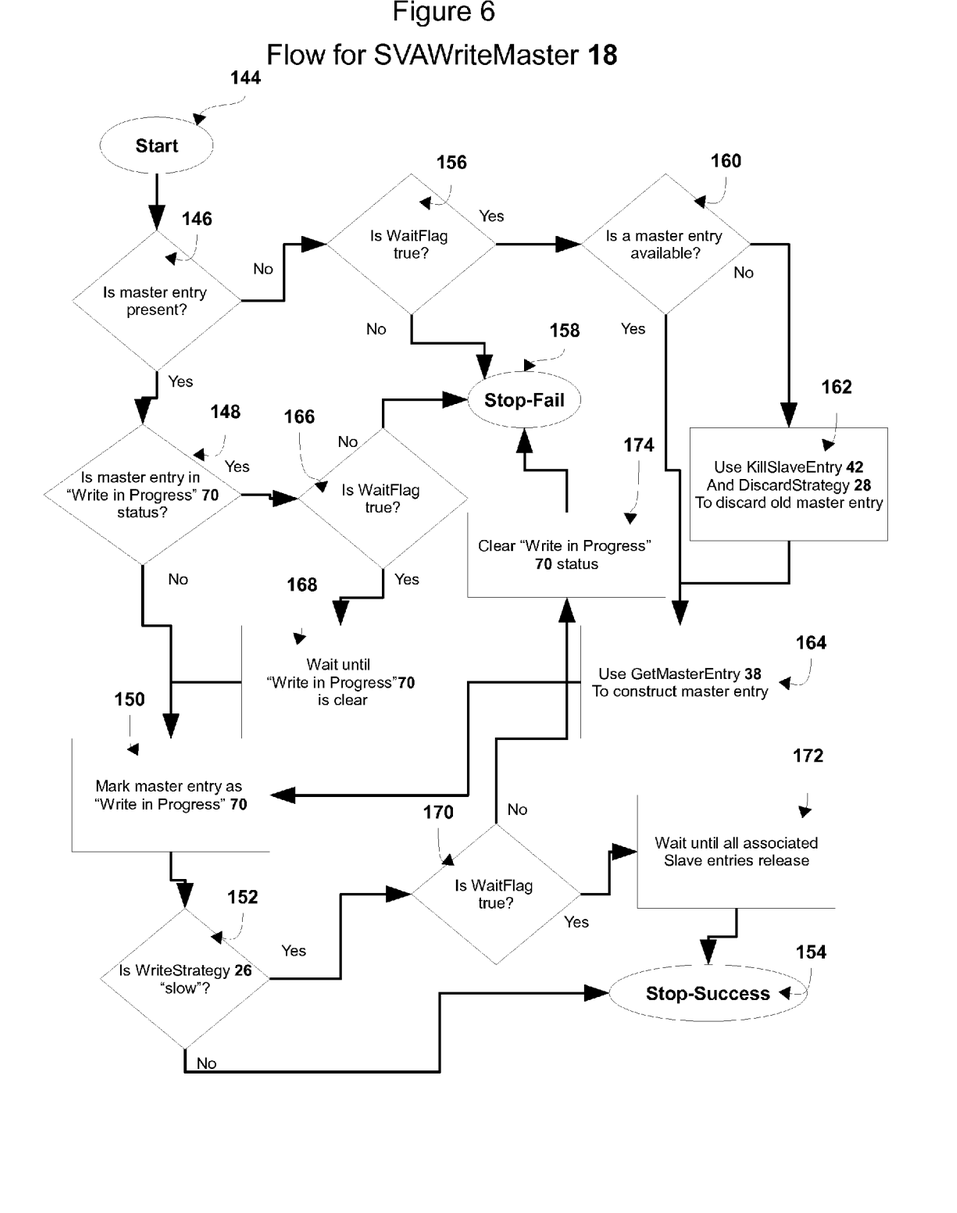
FIG. 6 is a logic flow diagram showing the logic flow for SVAWriteMaster.

The subroutine SVAWriteMaster 18 (FIG. 2D) uses the flowchart in FIG. 6 to ensure that a given master entry is in a buffer and to mark it as "Write in Progress" 70 so as to avoid its being used as the source buffer for a slave entry until it is released. Techniques standard in the art are to be used to avoid two processors or threads simultaneously receiving write access to the same master entry. The inputs to this subroutine are: SVAIdentifier 26, which identifies the particular SVA being operated upon; EntryKey 48, which is a numeric identifier used to select a particular entry of the SVA for modification—its precise meaning is user-defined, as it is simply passed to GetMasterEntry 38 for identifying a master entry to construct; and WaitFlag 50, which specifies whether the subroutine is to return or not if the indicated master entry is not immediately available. The output of SVAWriteMaster 18 is MasterBuffer 54, the address of the buffer containing the requested master entry.

The subroutine SVAReleaseMaster 20 (FIG. 2E) is used to terminate a modification of a master entry. If WriteStrategy 26 is "unsafe," it first uses GetSlaveEntry 40 to rebuild all slaves associated to this master entry. Then, it marks the master entry as "Dirty" 64 and releases the master entry from "Write in Progress" 70 status. The inputs to this subroutine are: SVAIdentifier 26, which identifies the particular SVA being operated on; and MasterBuffer 54, the address of the master entry buffer to release.

Figure 7:
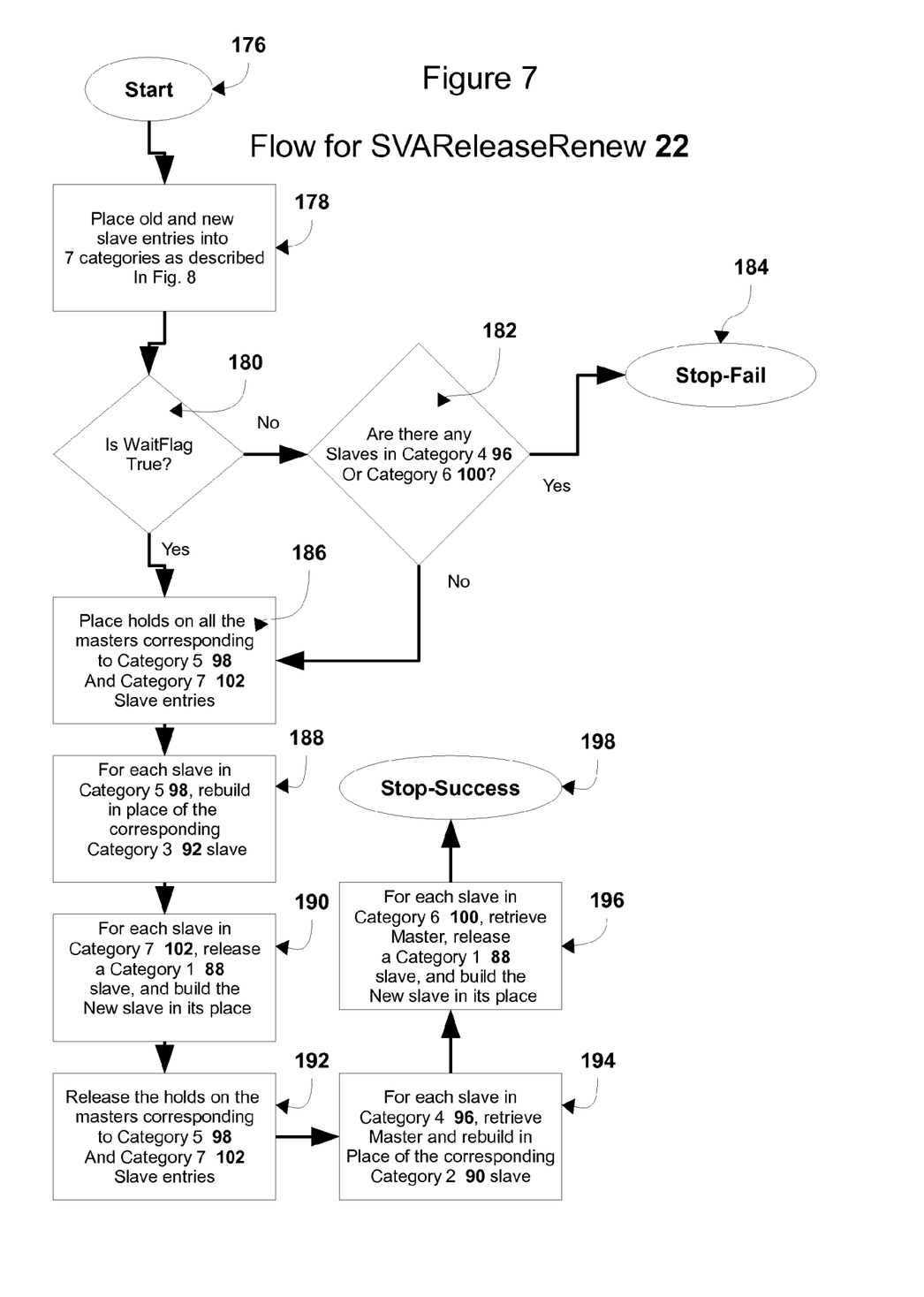
FIG. 7 is a logic flow diagram showing the logic flow for SVAReleaseRenew.
Figures 8, 8A:
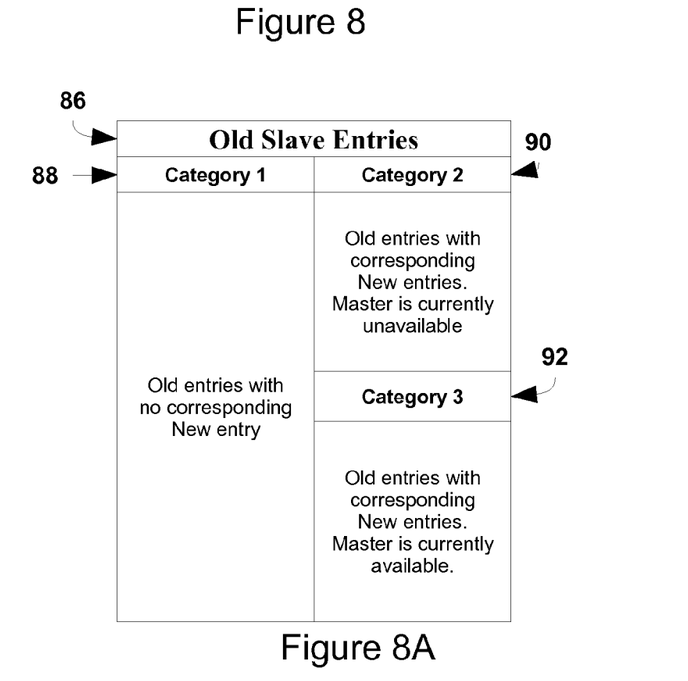
FIGS. 8A and 8B are schematics of subroutines showing data structure for old slave entries and new slave entries.

The subroutine SVAReleaseRenew 22 (FIG. 2F) is used to atomically release and retrieve a group of slave entries. FIG. 7 gives the flow of this subroutine, while FIG. 8 gives the definitions of the various categories of old and new slave entries used in FIG. 7. The inputs to this subroutine are: SVAIdentifier 26, which identifies the particular SVA being operated upon; NumEntries 56, a numeric size selector giving the size of each of the input arrays; SlaveArray 58, an array of SlaveBuffer 52 addresses specifying the old slave entries 86 to release; KeyArray 60, an array of EntryKey 48 entry identifiers specifying the keys of the new slave entries 94 to retrieve or rebuild; and WaitFlag 50, which specifies whether or not the subroutine is to return if one or more of the needed master entries are not immediately available. The output of SVAReleaseRenew 22 is SuccessFlag 62 which indicates whether or not all retrievals proceeded successfully. If SuccessFlag 62 indicates success, then the SlaveArray 58 addresses have been replaced with appropriate SlaveEntry 52 addresses corresponding to the key values in KeyArray 60. If SuccessFlag 62 indicates failure, then SlaveArray 58 is in an undefined state and the only way to continue reliably is to use SVAReleaseSlave 16 to release each entry in SlaveArray 58.

The subroutine SVADestroy 24 (FIG. 2G) is used to release all of the resources associated with an SVA, including a call to KillMasterEntry 42 on each active master entry, and a call to KillSlaveEntry 44 on each active slave array entry. SVADestroy 24 should only be called when all threads using these entries have completed their tasks. The input to this subroutine is: SVAIdentifier 26, which identifies the particular SVA being operated upon. There is no output from this subroutine.

Figure 3A:
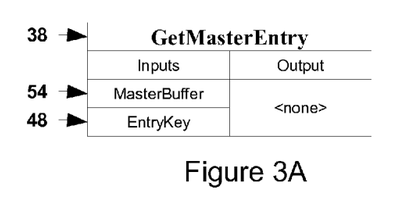
FIGS. 3A through 3D are schematics of subroutines showing the software interface of the software subroutines provided by the user of the invention.

FIGS. 3A through 3D describe the software interface for the user-provided subroutines GetMasterEntry 38, GetSlaveEntry 40, KillMasterEntry 42, and KillSlaveEntry 44. All these routines have no explicit output. The user-provided subroutine GetMasterEntry 38 of FIG. 3A is called to create a master entry and has the following inputs: MasterBuffer 54, the memory address at which the master entry is to be created; and EntryKey 48, a numeric entry identifier that has user-defined meaning.

Figure 3B:
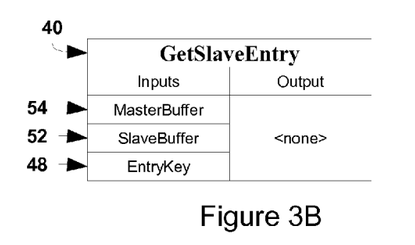

The user-provided subroutine GetSlaveEntry 40 of FIG. 3B is called to create a slave entry from a master entry and has the following inputs: MasterBuffer 54, the memory address of the master entry from which to create the slave; SlaveBuffer 52, the memory address at which the slave entry is to be created; and EntryKey 48, a numeric entry identifier that has user-defined meaning. If GetSlaveEntry 40 is omitted, the contents of MasterBuffer 54 will be copied to the SlaveBuffer 52.

Figure 3C:
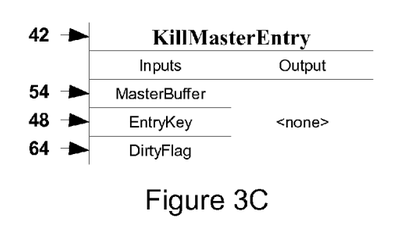

The user-provided subroutine KillMasterEntry 42 of FIG. 3C is called to release any resources allocated by GetMasterEntry 38 and, optionally, to update external resources as a result of the modification of the master entry. This subroutine has the following inputs: MasterBuffer 54, the memory address of the master entry is to be destroyed; EntryKey 48, a numeric entry identifier that has user-defined meaning; and DirtyFlag 64 an indicator of whether or not the master entry has been modified. If KillMasterEntry 42 is omitted, no deallocation will be done.

Figure 3D:
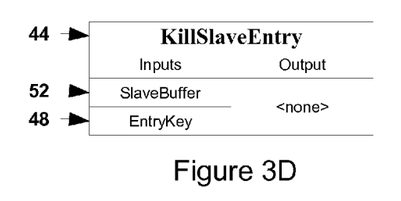

The user-provided subroutine KillSlaveEntry 44 of FIG. 3D is called to release any resources allocated by GetSlaveEntry 40 and has the following inputs: SlaveBuffer 52, the memory address of the slave entry to be destroyed; and EntryKey 48, a numeric entry identifier that has user-defined meaning. If KillSlaveEntry 44 is omitted, no deallocation will be done.

Preferred Embodiment

Operation

The preferred embodiment operates under the control of the user software as a set of subroutines. SVACreate 12 is called to create a specific SVA, including the specification of WriteStrategy 26, DiscardStrategy 28, the size selectors (NumMasters 32, NumSlaves 34, and EntrySize 36), the user-provided subroutine GetMasterEntry 38, and, optionally, user-provided subroutines GetSlaveEntry 40, KillMasterEntry 42, and KillSlaveEntry 44. The identifier SVAIdentifier 26 is then passed to all of the individual threads comprising the user software system. Each of these threads, then, calls SVARetrieveSlave 14 of FIG. 5 to retrieve the entries it needs from the SVA, calls SVAReleaseRenew 22 of FIG. 7 if it needs to move its set of entries to a different set, then calls SVAReleaseSlave 16 to release its entries when it is finished. Should a thread need to modify a master entry, it calls SVAWriteMaster 18 of FIG. 6 to request write access, and SVAReleaseMaster 20 when the write is finished. When all activity is finished on all threads, SVADestroy 24 is called to destroy the SVA.

As previously described, the subroutine SVARetrieveSlave 14 is shown in the logic flow diagram of FIG. 5. The subroutine begins at step 120 and then in step 122 determines if a corresponding master entry is present in memory. If so, step 124 inquires as to whether this entry is currently in a "write in progress" state. Then, if not, in step 126 the system uses the GetSlaveEntry 40 command (FIG. 2A) to construct the slave array entry and the subroutine is complete in step 128. Returning to step 122, if no corresponding master entry is present, then in step 130 the system queries if the WaitFlag 50 (FIG. 2B) is set (true). If it is not true, then the subroutine stops at step 132; if it is true, then the system queries in step 134 if a master entry is available. If so, then in step 136 the system uses the GetMasterEntry 38 command (FIG. 2A) and the EntryKey 48 command (FIG. 2B) to construct the master entry. The logic continues then at step 126 as previously described. However, in step 134 if no master entry is available, the system in step 138 calls the KillSlaveEntry 42 command, using the DiscardStrategy 28 (FIG. 2A) to discard the master entry. The system resumes at step 136 as previously described. Returning to step 124, if the master entry is in a "write in progress" 70 state (FIG. 4A), then in step 140 the system queries if the WaitFlag 50 is set (true) and if not, the logic flow stops at step 132. If the WaitFlag 50 is true, then in step 142 the system waits until the "wait in progress" 70 clears, then resumes at step 126 as previously described.

As previously described, the subroutine SVAWriteMaster 18 is shown in the logic diagram in FIG. 6. The subroutine begins in step 144 and then in step 146 determines if the indicated master entry is currently present in memory. If so, step 148 inquires if said master entry is in a "write in progress" 70 state (FIG. 4A). Then, if not, in step 150, said master entry is placed into a "write in progress" 70 state (FIG. 4A), and step 152 inquires if WriteStrategy 26 (FIG. 2A) is "slow." If not, the subroutine completes successfully in step 154. Returning to step 152, if WriteStrategy 26 (FIG. 2A) is "slow," the logic moves to step 170 and inquires if WaitFlag 50 (FIG. 2D) is true. If not, step 174 resets the "write in progress" 70 status (FIG. 4A), and the subroutine terminates with a failure in step 158. Returning to step 170, if WaitFlag 50 (FIG. 2D) is true, the logic proceeds to step 172 where it waits until all associated slaves release. The subroutine then terminates successfully in step 154. Returning to step 148, if said master entry is in a "write in progress" 70 state (FIG. 4A), then the subroutine proceeds to step 166 where it inquires whether WaitFlag 50 (FIG. 2D) is true. If not, the subroutine terminates in step 158 with a failure as previously described. Returning to step 166, if WaitFlag 50 (FIG. 2D) is true, the subroutine proceeds to step 168, where it waits until the "write in progress" 70 state (FIG. 4A) is cleared. It then proceeds to step 150, as previously described. Returning to step 146, if said master entry is not present in memory, the subroutine inquires in step 156 whether WaitFlag 50 (FIG. 2D) is true. If not, the subroutine terminates in step 158 with a failure as previously described. Returning to step 156, if WaitFlag 50 (FIG. 2D) is true, the subroutine proceeds to inquire, in step 160, whether a master entry is available. If so, the subroutine proceeds to step 164 where it uses GetMasterEntry 38 (FIG. 2A) to create the desired master entry. It then proceeds to step 150, as previously described. Returning to step 160, if no master entry is available, the subroutine proceeds to step 162, where it uses KillSlaveEntry 42 (FIG. 2A) and DiscardStrategy 28 (FIG. 2A) to discard a master entry, making it available for use. The subroutine then proceeds to step 164 as previously described.

Figure 8B:
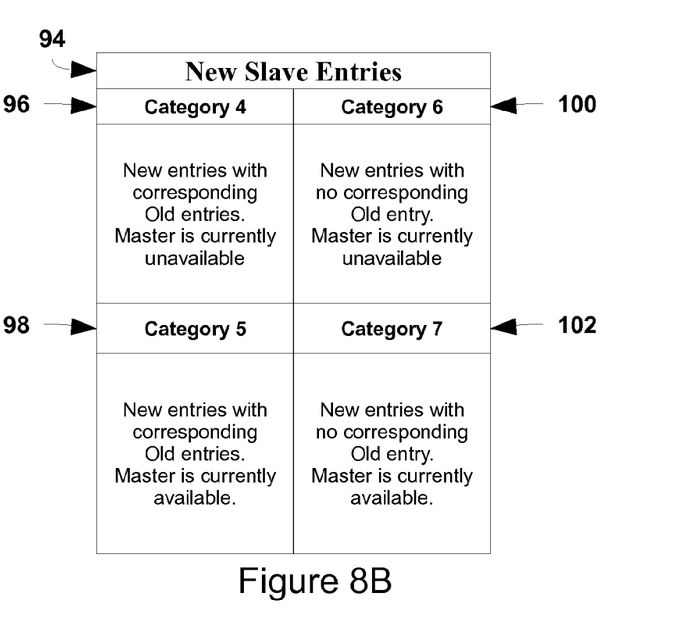

As previously described, the subroutine SVAReleaseRenew 22 is shown in the logic diagram in FIG. 7. The subroutine begins in step 176 and proceeds to step 178, where it categorizes the old (to be released) slave entries and the new (to be renewed) slave entries into the seven categories listed in FIG. 8A and FIG. 8B. Then, in step 180, it inquires whether WaitFlag 50 (FIG. 2F) is true. If not, it proceeds to step 182 where it inquires whether there are any slaves in Category 4 96 or Category 6 100 (FIG. 8B). If there are slaves in either of these categories, the subroutine terminates with failure in step 184. Returning to step 182, if there are no slaves in either category, the subroutine proceeds to step 186, where it places a hold 68 (FIG. 4A) on all masters corresponding to slaves in Category 5 98 and Category 7 102 (FIG. 8B). Then, in step 188, the subroutine processes the slaves in Category 5 98 (FIG. 8B), rebuilding each in place of the corresponding Category 3 92 (FIG. 8A) slave. Next, in step 190, the subroutine processes the slaves in Category 7 102 (FIG. 8B), releasing a slave in Category 1 88 (FIG. 8A) for each Category 7 102 slave, then rebuilding each Category 7 102 slave in the place of the released Category 1 88 slave. Logic then flows to step 192, where the subroutine releases the holds that were placed in step 186 on said masters corresponding to Category 5 98 and Category 7 102 (FIG. 8B) slaves. The subroutine then proceeds to step 194, where it processes the slaves in Category 4 96 (FIG. 8B), retrieving the corresponding masters and rebuilding each in place of the corresponding Category 2 90 (FIG. 8A) slave. Then, in step 196, processes the slaves in Category 6 100 (FIG. 8B), retrieving the corresponding masters, releasing the remaining Category 1 88 (FIG. 8A) slaves and rebuilding the Category 6 100 (FIG. 8B) slaves in their place. Then, the subroutine terminates successfully at step 198. Returning to step 180, if WaitFlag 50 (FIG. 2F) is true, the subroutine proceeds to step 186 as previously described.

Other Preferred Embodiments

The above embodiment is a minimal embodiment designed to be illustrative of the main points of the invention. Many alternate embodiments are possible that amplify the basic idea of the invention, while augmenting the functionality somewhat. A further embodiment involves adding additional memory synchronization features to make the "unsafe" write strategy easier to use. Methods for doing so are well-known in the art, and these could be easily added to the base embodiment. A still further embodiment involves adding features to the functions to facilitate object-oriented programming using the invention. At its simplest, this would involve adding opaque "instance handles" for SVAs that would be passed to the appropriate functions and subroutines.

A still further embodiment involves the use of a special EntryKey 48 value and a special SlaveBuffer 52 value to specify "no entry," thus allowing SVAReleaseRenew 22 to retrieve more or fewer slave entries than the number of slave entries released.

Although the description above contains many specificities, these should not be construed as limiting the scope of the invention but as merely providing illustrations of some of the presently preferred embodiments of this invention. Various other embodiments and ramifications are possible within its scope.

Thus the scope of the invention should be determined by the appended claims and their legal equivalents, rather than by the examples given.

We claim:

1. A system for providing shared buffered access to array entries of a virtual array, said virtual array comprising user-provided means for constructing a master array entry from a user-defined entry key identifier, user-provided means for destroying said master array entry and releasing any resources used, user-provided means for constructing a slave array entry from said master array entry, and user-provided means for destroying said slave array entry and releasing any resources used, system comprising a non-transitory computer-readable medium and computer software with a defined software interface, said software interface comprising:

a. a shared virtual array construction means which, given said user-provided master array entry construction means, said user-provided master array entry destruction means, said user-provided slave array entry construction means, said user-provided slave array entry destruction means, array entry size, a maximum number of simultaneous master array entries to retain, and a maximum number of simultaneous slave array entries to retain as input, said shared virtual array construction means providing a shared virtual array identifier to its user;

b. slave array entry access means providing read access to a slave array entry, given said shared virtual array identifier provided by said shared virtual array construction means, and a user-defined entry key identifier, said slave array entry access means providing the memory address of a slave array entry for the exclusive use of its caller;

c. slave array entry release means releasing said access to said slave array entry, given said shared virtual array identifier and said memory address of said slave array entry provided by said slave array entry access means;

d. release and renew means, which releases and renews access to a plurality of slave array entries, given said shared virtual array identifier, a group of said memory addresses of said slave entries, and a group of said user-defined entry key identifiers, said release and renew means effectively releasing the entire group of said slave entries, and providing access to the entire group of slave entries identified by said group of user-defined entry key identifiers, while disallowing the destruction of any existing master array entries associated to any members of said group of user-defined entry key identifiers; and e. shared virtual array destruction means, which destroys a shared virtual array, given said shared virtual array identifier.

2. The system of claim 1 further comprising:

a. master array entry modification access means, which provides write access to a master array entry, given said shared virtual array identifier, and a user-defined entry key identifier, said master array entry modification access means providing the memory address of a master array entry for the exclusive use of its caller, which may modify said master array entry; and b. master array entry modification release means releasing said write access to said master array entry, given said shared virtual array identifier, and said memory address of said master array entry, provided by said master array entry modification access means.

3. The system of claim 2 further comprising means to specify a plurality of discard strategies to said shared virtual array construction means, the strategies comprising:

a. a least recently used (LRU) strategy, in which, when an existing master array entry must be discarded to make room for a requested master array entry, the least recently used master array entry, among those not currently being held by the release and renew means or the master array entry modification access means, is chosen to be discarded;

b. age, in which, when an existing master array entry must be discarded to make room for a requested master array entry, the oldest master array entry, among those not currently being held by the release and renew means or the master array entry modification access means, is chosen to be discarded; and c. key, in which, when an existing master array entry must be discarded to make room for a requested master array entry, the master array entry with the smallest user-defined entry key identifier, among those not currently being held by the release and renew means or the master array entry modification access means, is chosen to be discarded.

4. The system of claim 3 further comprising means to specify a plurality of update strategies to said shared virtual array construction means, the strategies comprising:

a. lazy, in which, following a modification of said master array entry, any new slave array entries with the same entry key identifier will be constructed from said modified master array entry, but preexisting slave entries will not be updated;

b. slow, in which said master array entry modification access means delays modification of said master array entry until said master array entry has no currently associated slave array entries; following modification of said master array entry, new slave array entries with the same entry key identifier will be constructed from said modified master array entry; and c. unsafe, in which said master array entry modification release means also updates all preexisting slave array entries with the same entry key identifier; said user-provided slave array entry construction means is responsible to ensure that said update will not disrupt ongoing processing using said slave array entries.

* * * * *